United States Patent [19]

Blomgren et al.

[11] Patent Number: 5,246,794

[45] Date of Patent: Sep. 21, 1993

[54] CATHODE COLLECTOR MADE FROM CARBON FIBRILS

[75] Inventors: George E. Blomgren, Lakewood; John C. Bailey, Columbia Station, both of Ohio

[73] Assignee: Eveready Battery Company, Inc., St. Louis, Mo.

[21] Appl. No.: 671,234

[22] Filed: Mar. 19, 1991

[51] Int. Cl.$^5$ .................. H01M 4/30; H01M 4/64; H01M 6/16

[52] U.S. Cl. .................. 429/101; 429/188; 429/218; 429/217; 429/196

[58] Field of Search ............ 429/101, 188, 194, 218, 429/217, 196; 428/113, 443.2; 252/510, 511

[56] References Cited

U.S. PATENT DOCUMENTS

| | | | |
|---|---|---|---|
| 3,395,049 | 7/1968 | Thompson | 264/127 |
| 4,391,787 | 7/1983 | Tibbetts | 423/447.3 |
| 4,491,569 | 1/1985 | Tibbetts | 423/447.3 |
| 4,497,788 | 2/1985 | Bradley | 423/447.3 |
| 4,565,684 | 2/1986 | Tibbetts et al. | 423/447.3 |
| 4,663,230 | 5/1987 | Tennent | 428/367 |
| 4,795,687 | 1/1989 | Suzuki et al. | 429/213 |

FOREIGN PATENT DOCUMENTS

| | | |
|---|---|---|
| 59-35363 | 8/1982 | Japan. |
| 860-185366 | 9/1985 | Japan. |
| 63-58763 | 3/1988 | Japan. |
| 63-282313 | 11/1988 | Japan. |
| 64-14869 | 1/1989 | Japan. |
| 64-64645 | 1/1989 | Japan. |

OTHER PUBLICATIONS

Walker, Jr. et al, "Chemistry and Physics of Carbon", vol. 14; 1978; pp. 151–152.

PCT International Patent Application WO 91/05089, filed by Hyperion Catalysis International, Inc., published Apr. 18, 1991.

"Why are Carbon Filaments Tubular," by Gary G. Tibbetts, *Journal of Crystal Growth*, vol. 66, pp. 632–638, (1984).

*Graphite Fibers and Filaments*, by Dresselhaus, M. S.; Dresselhaus, G.; Sugihara, K.; Spain, I. L.; and Goldberg, H. A., pp. 10–30, (1988).

"The Formation of Filamentous Carbon," by Baker, T. K., and Harris, P. S., *Chemistry and Physics of Carbon*, vol. 14, pp. 83–165, (1978).

*Primary Examiner*—Karl Group
*Assistant Examiner*—C. M. Bonner
*Attorney, Agent, or Firm*—Robert W. Welsh

[57] ABSTRACT

Cathode collectors are made in a substantially dry method from carbon fibrils that have a fiber diameter of from about 2 to about 200 nanometers, a fiber length to diameter ratio of from about 10 to about 500, with a maximum length of 1 millimeter, and a fiber surface area of from about 10 to about 500 m$^2$/g, and a binder.

3 Claims, No Drawings

CATHODE COLLECTOR MADE FROM CARBON FIBRILS

STATEMENT OF GOVERNMENT INTEREST

This invention was made with Government support under Contract N00014-86-C0808 awarded by the Department of the Navy. The Government has certain rights in the invention.

This invention relates to cathode collectors, methods for making them and their use in liquid cathode cells.

BACKGROUND OF THE INVENTION

Liquid cathode cells are comprised of an anode and an electrolyte that also functions as the cathode material of the cell. Because these cells have a high initial voltage and show an essentially flat discharge curve, they are used in high performance applications.

A primary factor that affects the discharge capacity of liquid cathode cells, particularly under high rate discharge conditions, is the volume of voids in the cathode collector which are available for the deposition of the solid discharge products. The cathode collector is typically comprised of an electrically conductive material, such as graphite or acetylene black, and a binder, such as polytetrafluoroethylene. These collectors can be made by mixing the components and molding a rod or forming a sheet of the mixture. A liquid is typically used in the mixing step to facilitate the workability of the powdered components. Aqueous and nonaqueous liquids can be used. The use of these liquids can present processing problems. For example, if an aqueous liquid is used, substantially all of the water must be removed to avoid a violent reaction with the anode material which is usually an alkali metal or alkaline earth metal such as lithium. For nonaqueous liquids, removing the liquid can involve environmental concerns.

Therefore, there remains a desire for cathode collectors that have a volume of voids that will enable high cathode utilization, and for methods for making cathode collectors that are free of the problems associated with drying and removal of the wetting liquid.

SUMMARY OF THE INVENTION

This invention is a method for making cathode collectors. The method comprises mixing an amount of substantially dry carbon fibrils with a binding amount of a substantially dry binder. The carbon fibrils have a fiber diameter of from about 2 to about 200 nanometers, a fiber length to diameter ratio of from about 10 to about 500, with a maximum length of 1 millimeter, and a fiber surface area of from about 10 to about 500 $m^2/g$. This mixture is then formed into the cathode collector structure.

In another aspect, this invention is a liquid cathode electrochemical cell comprising a cathode collector prepared according to the above-described method.

In yet another aspect, this invention is an electrochemical cell comprising an anode, a liquid cathode-electrolyte solution and a cathode collector. The collector is formed from a mixture of carbon fibrils that have a fiber diameter of from about 2 to about 200 nanometers, a fiber length to diameter ratio of from about 10 to about 500, with a maximum length of 1 millimeter, and a fiber surface area of from about 10 to about 500 $m^2/g$, and a binder.

The cathode collectors made according to the method of this invention show a high degree of cathode utilization Since the method is a dry process, it does not have the problems associated with drying the product and removal of a wetting liquid. The cathode collectors can be used in a variety of electrochemical cells, especially in liquid cathode cells.

DETAILED DESCRIPTION OF THE INVENTION

The cathode collectors of this invention are used to collect the current from the cathode so it can then be transferred to a terminal of the cell. Its primary component is an electrically conductive material. The electrically conductive material used in this invention are carbon fibrils that have a fiber diameter of from about 2 to about 200 nanometers, a fiber length to diameter ratio of from about 10 to about 500, with a maximum length of 1 millimeter, and a fiber surface area of from about 10 to about 500 $m^2/g$. Preferably, the fiber surface area is between about 100 to about 300 $m^2/g$. The fibrils are substantially "dry," i.e. the fibrils have a moisture content below that which would adversely react with the cell components. The fibrils are essentially cylindrical fibrils with an outer region of multiple essentially continuous layers of ordered carbon atoms and a distinct inner core region. The inner core of the fibril can be hollow or contain carbon atoms that are less ordered than the carbon atoms of the outer region.

These fibrils can be produced by contacting for a suitable time at a suitable pressure a catalyst of metal-containing particles with a gaseous, carbon-containing precursor compound at an effective temperature. The temperature of the process is high enough to cause the catalyst particles to be active for fibril formation and low enough to avoid significant thermal decomposition of the gaseous carbon-containing precursor compound with formation of pyrolytic carbon. This temperature typically ranges from about 850° C. to about 1200° C. The dry weight ratio of the carbon-containing compound to metal-containing particles is about 100:1.

Suitable carbon-containing compounds include hydrocarbons, for example, the aromatic hydrocarbons such as benzene, toluene, xylene, cumene, ethylbenzene, naphthalene, phenanthrene, anthracene or mixtures thereof; aliphatic hydrocarbons such as methane, ethane, propane, ethylene, propylene, acetylene or mixtures thereof; and oxygen-containing hydrocarbons such as formaldehyde, acetaldehyde, acetone, methanol, ethanol or mixtures thereof; and carbon monoxide.

Preferred metals of the metal-containing particles are the transition metals. Preferred metals are iron, cobalt and nickel. The particles preferably have a diameter of between about 3.5 and about 70 nanometers. The particles can be supported on a chemically compatible refractory support. Examples of suitable supports are alumina, carbon, or a silicate such as aluminum silicate.

The fibrils can be made, for example, by contacting iron-containing particles, such as $Fe_3O_4$, with benzene in the presence of hydrogen. The temperature is between 900° C. and 1150° C., the pressure is from about one-tenth atmosphere to about ten atmospheres, and the time for contacting the iron-containing particles with benzene is from about 10 seconds to about 180 minutes. The ratio of benzene to iron-containing particles by weight is greater than about 1000:1.

The fibrils are highly graphitic as grown. The individual graphitic carbon layers are concentrically arranged around the long axis of the fiber like the growth rings of a tree, or like a scroll of hexagonal chicken wire. The fibrils are essentially cylindrical and have a substantially constant diameter, an outer region of multiple layers of ordered carbon atoms and a distinct inner core region. The layers and core are disposed concentrically about the cylindrical axis of the fibril. The term "cylindrical" is used herein in the broad geometrical sense. A circle or an ellipse are two of the many possible cross sectional curves of the cylinder.

The inner core region of the fibril may be hollow, or may comprise carbon atoms which are less ordered than the ordered carbon atoms of the outer region. "Ordered carbon atoms" means graphitic domains having their c-axes substantially perpendicular to the cylindrical axis of the fibril.

The binders useful in this invention are, preferably, substantially dry organic powders. By "substantially dry" is meant that the binder has a moisture content below that which would adversely react with the cell components. Examples include polytetrafluoroethylene and fluorinated ethylene-propylene copolymers.

The fibrils and binder are dry mixed together, i.e. they are mixed together in the substantial absence of liquid or moisture. The fibrils comprise the major amount of the mixture. The amount of fibrils used by weight ranges from about 85 to about 97 weight percent, preferably from about 90 to about 95 weight percent. The amount of binder used is an amount sufficient to bind together the amount of fibers in the desired cathode collector form. This amount typically ranges from about 3 to about 15 weight percent, preferably from about 5 to about 10 weight percent.

Although, the maximum benefits for most applications are realized when the dry process of this invention is used, alternatively, in certain applications, the cathode collectors of this invention can be made with the use of a wetting liquid. For example, an aqueous suspension of a polytetrafluorethylene binder can be mixed with the carbon fibrils. The mix can then be partially dried to remove excess water, molded or pressed into the desired form and ultimately dried. Optionally, the carbon fibrils and dry binder material can be mixed together and wetted with an organic solvent such as mineral spirits or trichloroethylene to form a plastic mass. The collector mix can then molded or pressed into the desired shape and the organic solvent removed by vaporization.

Other components can be added to the cathode collector mixture. These optional components are employed to perform specific functions. Examples of these optional components include catalysts, such as macrocyclic compounds, e.g., the phthalocyanines, porphyrins and tetraazaannulenes.

The cathode collectors are formed into a variety of physical forms or structures. The most common forms or structures are a rod and a sheet. To form the rod, the dry mixture is placed in a mold under pressure. The pressure used is sufficient to form a rod with a porosity effective to allow the electrolyte of the cell to be absorbed into the rod. To form the sheet, the mixture is cast onto a roll or a support and compressed. These sheets are useful in jelly-roll type electrochemical cells.

The cathode collectors of this invention can be used in a variety of electrochemical cells. Since the preferred collectors are made by a dry process, they can be advantageously used in cells that employ components that are sensitive to moisture. A type of electrochemical cell system that finds the cathode collectors of this invention especially useful is the liquid cathode electrochemical system. This system comprises an anode and a cathode-electrolyte. The cathode-electrolyte has a solute dissolved in an electrochemically active liquid solvent such as an oxyhalide of a Group V or Group VI element of the Periodic Table, or a liquid halide of an element of Group IV to VI, or $SO_2$. The electrolyte solvent performs the dual function of acting as solvent for the electrolyte salt and as the active cathode depolarizer of the cell. Such cells are disclosed in U.S. Pat. No. 4,400,453 and U.S. Pat. No. 4,444,855 which are herein incorporated by reference.

Useful anode materials for the oxyhalide cells are the consumable metals and include the alkali metals, alkaline earth metals and alloys of alkali metals or alkaline earth metals with each other and other metals. Preferred anode materials are the alkali metals and particularly lithium, sodium and potassium.

The solute used in the cathode-electrolyte can be a simple or double salt which will produce an ionically conductive solution when dissolved in the solvent. Preferred solutes are complexes of inorganic or organic Lewis acids and inorganic ionizable salts The only requirements for utility are that the salt be compatible with the solvent employed and that it yield a solution that is ionically conductive.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

Useful electrolyte solvents for the cathode-electrolyte are the oxyhalides of elements of Group V and VI of the Periodic Table. These oxyhalides are generally liquids at normal temperatures and possess good diffusional and electrochemical properties. Examples of preferred oxyhalides include phosphoryl chloride, vanadyl trichloride, vanadyl tribromide, thionyl chloride, thionyl bromide, sulfuryl chloride, chromyl chloride and selenium oxychloride. Selected liquid halides of an element of Group IV to VI of the Periodic Table can also be used. Two or more of the liquid halides or oxyhalides or combinations of them can be used. Liquid $SO_2$ is also a useful cathode material.

A co-solvent can be optionally employed with the oxyhalide or halide solvent or $SO_2$ to alter, for example, the dielectric constant, viscosity or solvent properties of the liquid to achieve better conductivity. Suitable compounds include propylene carbonate, nitrobenzene, and dimethyl sulfoxide. Additionally, The electrolyte solution can be made more viscous by adding a gelling agent such as colloidal silica.

What is claimed is:

1. An electrochemical cell comprising an anode, a liquid cathode-electrolyte solution and a cathode collector formed from a mixture of carbon fibrils that have a fiber diameter of from about 2 to about 200 nanometers, a fiber length to diameter ratio of from about 10 to about 500, with a maximum length of 1 millimeter, and a fiber surface area of from about 10 to about 500 $m^2/g$, and a binder.

2. The electrochemical cell of claim 1, wherein the anode is an alkali metal and the cathode-electrolyte is comprised of an oxyhalide of the elements in Group V or VI, or a liquid halide of the elements of Group IV to VI of the Periodic Table, or $SO_2$.

3. The electrochemical cell of claim 2, wherein the anode is lithium and the oxyhalide solvent is thionyl chloride.

* * * * *